(12) United States Patent
Soubaras

(10) Patent No.: US 8,451,682 B2
(45) Date of Patent: *May 28, 2013

(54) METHOD AND APPARATUS FOR DEGHOSTING SEISMIC DATA

(75) Inventor: Robert Soubaras, Massy Cedex (FR)

(73) Assignee: CGGVeritas Services SA, Massy Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/155,778

(22) Filed: Jun. 8, 2011

(65) Prior Publication Data

US 2011/0305109 A1    Dec. 15, 2011

Related U.S. Application Data

(60) Provisional application No. 61/393,057, filed on Oct. 14, 2010.

(30) Foreign Application Priority Data

Jun. 10, 2010  (FR) ...................................... 10 54599

(51) Int. Cl.
    *G01V 1/38*    (2006.01)
(52) U.S. Cl.
    USPC .......................................................... 367/24
(58) Field of Classification Search
    USPC .......................................................... 367/24
    See application file for complete search history.

(56) References Cited

U.S. PATENT DOCUMENTS

| | | |
|---|---|---|
| 2,614,165 A | 10/1952 | Doolittle |
| 3,299,399 A | 1/1967 | Bowers |
| 3,491,848 A | 1/1970 | Giles |
| 3,885,515 A | 5/1975 | Caldwell, Jr. et al. |
| 4,068,208 A | 1/1978 | Rice, Jr. et al. |
| 4,101,866 A | 7/1978 | Ruehle |
| 4,233,677 A | 11/1980 | Brown et al. |
| 4,254,480 A | 3/1981 | French |

(Continued)

FOREIGN PATENT DOCUMENTS

| | | |
|---|---|---|
| EP | 0365270 A2 | 4/1990 |
| EP | 1426786 A1 | 6/2004 |

(Continued)

OTHER PUBLICATIONS

Soubaras, R., Dowle, R., Sablon, R., "Variable Depth Streamer Acquisition: Enhancing interpretation with broadband marine seismic". GeoConvention 2012: Vision. 6 pages.*

(Continued)

*Primary Examiner* — Isam Alsomiri
*Assistant Examiner* — James Hulka
(74) *Attorney, Agent, or Firm* — Patent Portfolio Builders, PLLC

(57) ABSTRACT

Apparatus, computer instructions and method for deghosting seismic data related to a subsurface of a body of water. The method includes inputting data recorded by detectors that are towed by a vessel, the data being associated with waves travelling from the subsurface to the detectors; applying a migration procedure to the data to determine a first image of the subsurface; applying a mirror migration procedure to the data to determine a second image of the subsurface; joint deconvoluting the first image and the second image for deghosting a reflectivity of the subsurface; and generating a final image of the subsurface based on the deghosted reflectivity of the joint deconvoluting step.

33 Claims, 9 Drawing Sheets

U.S. PATENT DOCUMENTS

| | | | |
|---|---|---|---|
| 4,353,121 | A | 10/1982 | Ray et al. |
| 4,404,664 | A | 9/1983 | Zachariadis |
| 4,486,863 | A | 12/1984 | French |
| 4,486,865 | A | 12/1984 | Ruehle |
| 4,532,617 | A | 7/1985 | Baecker et al. |
| 4,581,723 | A | 4/1986 | Savit |
| 4,635,236 | A | 1/1987 | Roberts |
| 4,872,144 | A | 10/1989 | Young et al. |
| 4,884,249 | A | 11/1989 | Snook |
| 4,979,150 | A | 12/1990 | Barr |
| 4,992,992 | A | 2/1991 | Dragoset, Jr. |
| 5,257,241 | A | 10/1993 | Henderson et al. |
| 5,930,731 | A | 7/1999 | Brzostowski |
| 5,959,938 | A | 9/1999 | Behrens |
| 6,024,344 | A | 2/2000 | Buckley et al. |
| 6,049,507 | A | 4/2000 | Allen |
| 6,088,299 | A | 7/2000 | Erath et al. |
| 6,317,695 | B1 | 11/2001 | Zhou et al. |
| 6,456,565 | B1 | 9/2002 | Grall et al. |
| 6,574,567 | B2 | 6/2003 | Martinez |
| 6,754,590 | B1 * | 6/2004 | Moldoveanu .......... 702/14 |
| 6,775,618 | B1 * | 8/2004 | Robertsson et al. .......... 702/14 |
| 7,372,769 | B2 | 5/2008 | Grion |
| 7,400,552 | B2 | 7/2008 | Moldoveanu et al. |
| 7,417,924 | B2 | 8/2008 | Vigen et al. |
| 7,599,798 | B2 | 10/2009 | Beasley et al. |
| 7,660,189 | B2 | 2/2010 | Vigen et al. |
| 2005/0027454 | A1 * | 2/2005 | Vaage et al. .......... 702/17 |
| 2006/0239122 | A1 | 10/2006 | Vigen et al. |
| 2007/0165486 | A1 * | 7/2007 | Moldoveanu et al. .......... 367/15 |
| 2007/0189374 | A1 * | 8/2007 | Comparsi De Castro et al. .......... 375/232 |
| 2008/0253225 | A1 | 10/2008 | Welker et al. |
| 2008/0279045 | A1 | 11/2008 | Vigen et al. |
| 2008/0300821 | A1 | 12/2008 | Frank et al. |
| 2009/0161488 | A1 | 6/2009 | Ferber et al. |
| 2009/0175124 | A1 | 7/2009 | Sorli |
| 2009/0231953 | A1 | 9/2009 | Welker et al. |
| 2009/0323467 | A1 | 12/2009 | Goujon et al. |
| 2010/0002537 | A1 | 1/2010 | Welker |
| 2010/0054082 | A1 | 3/2010 | McGarry et al. |
| 2010/0135112 | A1 | 6/2010 | Robertsson |
| 2011/0176384 | A1 | 7/2011 | Soubaras |
| 2012/0092956 | A1 | 4/2012 | Soubaras |
| 2012/0218858 | A1 | 8/2012 | Soubaras |
| 2012/0218859 | A1 | 8/2012 | Soubaras |
| 2012/0224454 | A1 | 9/2012 | Soubaras |

FOREIGN PATENT DOCUMENTS

| | | |
|---|---|---|
| EP | 2352040 A2 | 8/2011 |
| FR | 2 955 396 A1 | 7/2011 |
| FR | 2 955 397 A1 | 7/2011 |
| GB | 1588462 | 4/1981 |
| GB | 2425839 A | 11/2006 |
| WO | 2007006785 A2 | 1/2007 |
| WO | 2011086166 A1 | 7/2011 |

OTHER PUBLICATIONS

Soubaras, R., "Deghosting by joint deconvolution of a migration and a mirror migration": 80th Annual International Meeting, SEG, Expanded Abstracts, 2010. pages 3406-3409.*

M Wong, S Ronen, B Biondi. "Least-squares Reverse Time Migration/Inversion for Ocean Bottom Data: a Case Study" 2011 SEG Annual Meeting, 2011. 13 pages.*

U.S. Office Action dated Jul. 5, 2012, issued in related U.S. Appl. No. 13/272,149.

Dan Ebrom et al.; Facilitating Technologies for Permanently Instrumented Oil Fields; The Leading Edge; vol. 19, No. 3; Mar. 2000; XP002590895; pp. 282-285.

International Search Report mailed on Sep. 10, 2010 and issued in application No. PCT/EP2010/058174.

French Preliminary Search Report mailed on Jul. 8, 2010 and issued in French Application No. 1050278.

French Opinion mailed on Jul. 8, 2010 and issued in French Application No. 1050278.

Jim Leinbach; "Wiener Spiking Deconvolution and Minimum-phase Wavelets: a Tutorial", The Leading Edge, vol. 14, No. 3 pp. 189-192, Mar. 1995.

Robert Soubaras, "Veriable-depth streamer: deep towing and efficient deghosting for extended bad with" Aug. 2010.

Robert Soubaras, "Deghosting by joint deconvolution of a migration and a mirror migration" Aug. 2010, SEG Denver 2010 Annual Meeting.

International Search Report mailed on Sep. 19, 2011 and issued in application No. PCT/EP2011/059528.

Written Opinion of the International Search Authority mailed on Sep. 19, 2011 and issued in application No. PCT/EP2011/059528.

Daniel Trad Interpolation and multiple attenuation with migration operators' Geophysics, SEG, vol. 68, No. 6, Nov.-Dec. 2003, pp. 2043-2054.

International Search Report mailed on Aug. 31, 2012 in related application No. PCT/EP2011/068031.

International Search Report mailed on Apr. 21, 2011 in related application No. PCT/EP2011/050480.

US Office Action mailed on Aug. 13, 2012 in related U.S. Appl. No. 13/471,561.

US Office Action mailed on Aug. 8, 2012 in related U.S. Appl. No. 13/008,099.

US Office Action mailed on Aug. 3, 2012 in related U.S. Appl. No. 13/464,109.

US Office Action mailed on Aug. 15, 2012 in related U.S. Appl. No. 13/464,126.

GB Search Report mailed on Nov. 11, 2011 in related Application No. GB1117501.5.

U.S. Office Action issued on Jan. 7, 2013 in related U.S Appl. No. 13/464,149.

U.S. Office Action issued on Dec. 6, 2012 in related U.S Appl. No. 13/464,126.

U.S. Final Office Action issued Feb. 4, 2013 in related U.S Appl. No. 13/464,109.

U.S. Final Office Action issued Feb. 4, 2013 in related U.S Appl. No. 13/471,561.

US 6,456,564, 09/2002, Grall et al. (withdrawn)

* cited by examiner

METHOD AND APPARATUS FOR DEGHOSTING SEISMIC DATA

CROSS REFERENCE TO RELATED APPLICATIONS

This Nonprovisional application claims priority under 35 U.S.C. §119(e) to U.S. Provisional Application No. 61/393,057 filed on Oct. 14, 2010 and this application also claims priority under 35 U.S.C. §119(a) to Patent Application No. 1054599 filed in France on Jun. 10, 2010. The entire contents of each of the above documents is hereby incorporated by reference into the present application.

BACKGROUND

1. Technical Field

Embodiments of the subject matter disclosed herein generally relate to methods and systems and, more particularly, to mechanisms and techniques for deghosting seismic data.

2. Discussion of the Background

During the past years, the interest in developing new oil and gas production fields has dramatically increased. However, the availability of land-based production fields is limited. Thus, the industry has now extended drilling to offshore locations, which appear to hold a vast amount of fossil fuel. Offshore drilling is an expensive process. Thus, those engaged in such a costly undertaking invest substantially in geophysical surveys in order to more accurately decide where to drill or not (to avoid a dry well).

Marine seismic data acquisition and processing generate a profile (image) of the geophysical structure (subsurface) under the seafloor. While this profile does not provide an accurate location for the oil and gas, it suggests, to those trained in the field, the presence or absence of oil and/or gas. Thus, providing a high resolution image of the subsurface is an ongoing process for the exploration of natural resources, including, among others, oil and/or gas.

During a seismic gathering process, as shown in FIG. 1, a vessel 10 drags plural detectors 12. The plural detectors 12 are disposed along a cable 14. Cable 14 together with its corresponding detectors 12 are sometimes referred to by those skilled in the art as a streamer 16. The vessel 10 may tow plural streamers 16 at the same time. The streamers may be disposed horizontally, i.e., lying at a constant depth $z_1$ relative to the surface 18 of the ocean. Also, the plural streamers 16 may form a constant angle (i.e., the streamers may be slanted) with respect to the surface of the ocean as disclosed in U.S. Pat. No. 4,992,992, the entire content of which is incorporated herein by reference. FIG. 2 shows such a configuration in which all the detectors 12 are distributed along a slanted straight line 14 that makes a constant angle α with a reference horizontal line 30.

With reference to FIG. 1, the vessel 10 also drags a sound source 20 configured to generate an acoustic wave 22a. The acoustic wave 22a propagates downward and penetrates the seafloor 24, eventually being reflected by a reflecting structure 26 (reflector). The reflected acoustic wave 22b propagates upwardly and is detected by detector 12. For simplicity, FIG. 1 shows only two paths 22a corresponding to the acoustic wave. However, the acoustic wave emitted by the source 20 may be substantially a spherical wave, e.g., it propagates in all directions starting from the source 20. Parts of the reflected acoustic wave 22b (primary) are recorded by the various detectors 12 (the recorded signals are called traces) while parts of the reflected wave 22c pass the detectors 12 and arrive at the water surface 18. Since the interface between the water and air is well approximated as a quasi-perfect reflector (i.e., the water surface acts as a mirror for the acoustic waves), the reflected wave 22c is reflected back towards the detector 12 as shown by wave 22d in FIG. 1. Wave 22d is normally referred to as a ghost wave because this wave is due to a spurious reflection. The ghosts are also recorded by the detector 12, but with a reverse polarity and a time lag relative to the primary wave 22b. The degenerative effect that the ghost arrival has on seismic bandwidth and resolution are known. In essence, interference between primary and ghost arrivals causes notches, or gaps, in the frequency content recorded by the detectors.

The traces may be used to determine the subsurface (i.e., earth structure below surface 24) and to determine the position and presence of reflectors 26. However, the ghosts disturb the accuracy of the final image of the subsurface and for at least this reason, various methods exist for removing the ghosts, i.e., deghosting, from the results of a seismic analysis. Further, the actual measurements need to be processed for obtaining the correct position of the various parts (reflectors) of the subsurface. Such a processing method is the migration.

U.S. Pat. Nos. 4,353,121 and 4,992,992, the entire content of which is incorporated herein by reference, describe processing procedures that allow ghosts to be removed from recorded seismic data by using an acquisition device that includes a seismic streamer slanted at an angle (on the order of 2 degrees) to the surface of the water (slanted streamer).

Using slanted streamers, it is possible to achieve ghost suppression during data summation operation (during pre-stack operations). In fact, the acquired data are redundant, and the processing procedure includes a summation step or "stacking" for obtaining the final image of the subsurface structure from the redundant data. The ghost suppression is performed in the art during the stacking step because the recordings that contribute to the stack, having been recorded by different receivers, have notches at different frequencies, such that the information that is missing due to the presence of a notch on one seismic receiver is obtained from another receiver.

Further, U.S. Pat. No. 4,353,121 describes a seismic data processing procedure based on the following known steps: (1) common depth point collection, (2) one-dimensional (1D) extrapolation onto a horizontal surface, or "datuming", (3) Nomal MoveOut (NMO) correction, and (4) summation or stack.

Datuming is a processing procedure in which data from N seismic detectors $D_n$ (with positions $(x_n, z_n)$, where n=1, . . . N and N is a natural number, $x_i = x_j$ but $z_i$ different from $z_j$ with i and j taking values between 1 and N), is used to synthesize data corresponding to seismic detectors that have the same horizontal positions $x_n$ and a same constant reference depth $z_0$ for all the seismic detectors.

Datuming is called 1D if it is assumed that the seismic waves propagate vertically. In that case, the procedure includes applying to each time-domain recording acquired by a given seismic detector a delay or a static shift corresponding to the vertical propagation time between the true depth $z_n$ of a detector $D_n$ and the reference depth $z_0$.

Furthermore, U.S. Pat. No. 4,353,121 describes a summation of the primary (primary stack) by using the NMO correction that aligns the primaries, then a summation of the ghosts (ghost stack) by aligning the ghost reflections, and then combining the results of these two steps to obtain a post-stack image with a boosted signal-to-noise ratio.

Similar to U.S. Pat. No. 4,353,121, U.S. Pat. No. 4,992,992 proposes to reconstitute from seismic data recorded with a slanted cable seismic data as would have been recorded by a horizontal cable. However, U.S. Pat. No. 4,992,992, takes into account the non-vertical propagation of the seismic waves by replacing the 1D datuming step of U.S. Pat. No. 4,353,121 with a 2D datuming step. The 2D datuming step takes into account the fact that the propagation of the waves is not necessarily vertical, unlike what is assumed to be the case in the 1D datuming step proposed by U.S. Pat. No. 4,353,121.

More specifically, U.S. Pat. No. 4,992,992 reconstructs two sets of seismic data as if they had been recorded by a horizontal streamer and then sums the two sets after multiplication by a factor. The first set of data is synthesized by assuming that the seismic waves are propagating upward like the primary waves, and the second set is synthesized by assuming that the seismic waves are propagating downward like the ghosts. Upward propagation (rising wave) is defined by angles of propagation with respect to the horizontal between 0° and 180°, and downward propagation (descending wave) is defined by angles of propagation between 180° to 360° with the horizontal.

The methods described in U.S. Pat. Nos. 4,353,121 and 4,992,992 are seismic processing procedures in one dimension and in two dimensions. Such procedures, however, cannot be generalized to three dimensions. This is so because a sampling interval of the sensors in the third dimension is given by the separation between the streamers, on the order of 150 m, which is much larger than the sampling interval of the sensors along the streamers which is on the order of 12.5 m. Also, the existing procedures may apply a deghosting step at the beginning of the processing, which is not always very efficient.

Accordingly, it would be desirable to provide systems and methods that avoid the afore-described problems and drawbacks, e.g., provide a 3D seismic processing procedure which allows imaging of the subsurface geology based on marine seismic data recorded at different water depths.

SUMMARY

According to an exemplary embodiment, there is a method for deghosting seismic data related to a subsurface of a body of water. The method includes inputting data recorded by detectors that are towed by a vessel, the data being associated with waves travelling from the subsurface to the detectors; applying a migration procedure to the data to determine a first image of the subsurface; applying a mirror migration procedure to the data to determine a second image of the subsurface; joint deconvoluting the first image and the second image for deghosting a reflectivity of the subsurface; and generating a final image of the subsurface based on the deghosted reflectivity of the joint deconvoluting step.

According to still another exemplary embodiment, there is a processing device for deghosting seismic data related to a subsurface of a body of water. The processing device includes an interface configured to receive data recorded by detectors that are towed by a vessel, the data being associated with waves travelling from the subsurface to the detectors; and a processor connected to the interface. The processor is configured to apply a migration procedure to the data to determine a first image of the subsurface, apply a mirror migration procedure to the data to determine a second image of the subsurface, joint deconvolute the first image and the second image for deghosting a reflectivity of the subsurface, and generate a final image of the subsurface based on the deghosted reflectivity of the joint deconvoluting step.

According to still another exemplary embodiment, there is a computer readable medium including computer executable instructions, wherein the instructions, when executed, implement a method for deghosting seismic data related to a subsurface of a body of water. The method includes inputting data recorded by detectors that are towed by a vessel, the data being associated with waves travelling from the subsurface to the detectors; applying a migration procedure to the data to determine a first image of the subsurface; applying a mirror migration procedure to the data to determine a second image of the subsurface; joint deconvoluting the first image and the second image for deghosting a reflectivity of the subsurface; and generating a final image of the subsurface based on the deghosted reflectivity of the joint deconvoluting step.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
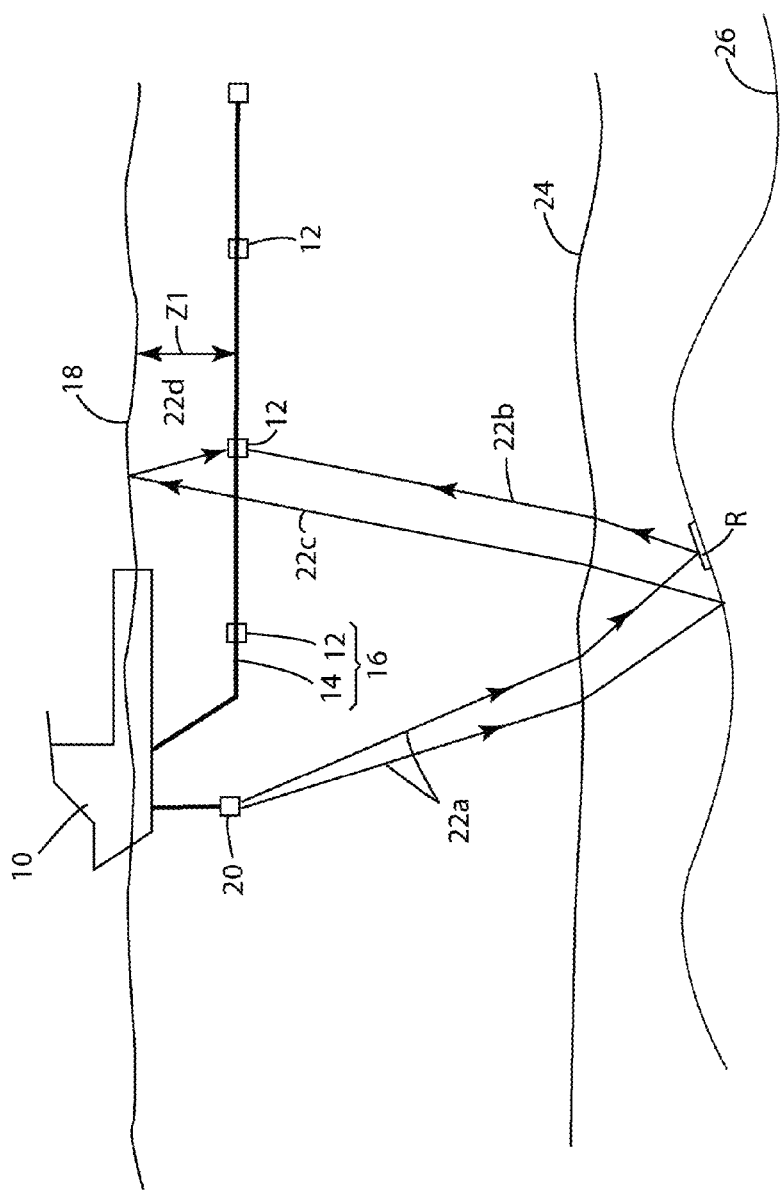
FIG. 1 is a schematic diagram of a conventional seismic data acquisition system having a horizontal streamer.
Figure 2:
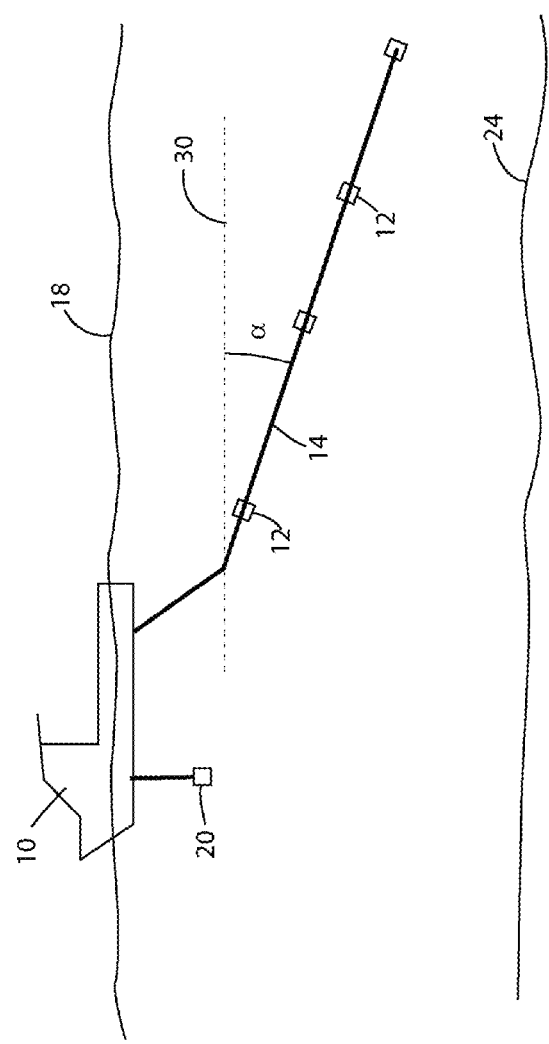
FIG. 2 is a schematic diagram of a conventional seismic data acquisition system having a slanted streamer.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of migration, mirror migration and matched mirror migration processes for determining a final image of a subsurface. However, the embodiments to be discussed next are not limited to these processes, but may be applied to other processes that are used for processing seismic data or other data related to the determination of the position of a structure that is not directly reachable for measurements.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for deghosting migration and mirror migration images by joint deconvolution for generating a final image of a subsurface. In another exemplary embodiment, the deghosting is performed at the end of the processing (during an imaging phase) and not at the beginning as for the traditional methods. In still another exemplary embodiment, no datuming step is performed on the data. In still another exemplary embodiment, the method is applicable without restrictions as to a direction of propagation of the waves. According to still another exemplary embodiment, a 3D seismic processing procedure is presented and the 3D procedure allows imaging of the subsurface geology based on marine seismic data recorded at different water depths. According to yet another exemplary embodiment, the data that are processed are collected using streamers having a curved profile, i.e., part of the detectors are not provided on a slanted streamer although the detectors have varying depths relative to the surface of the water. These kind of streamers were disclosed in French filed Patent Application Serial No. FR1052576, entitled, Method and Device to Acquire Marine Seismic Data, the entire content of which is incorporated herein by reference, and also in U.S. Provisional Patent Application No. 61/392,982, entitled, Method and Device to Acquire Seismic Data, the entire content of which is incorporated herein by reference. Also, French filed patent application serial no. FR1054599, having the title "Method to Process Marine Seismic Data" is incorporated herein by reference.

According to another exemplary embodiment, a novel deghosting method is adapted to any broadband acquisition technique. The deghosting method is insensitive to noise, amplitude preserving, and it is able to provide the true deghosted earth response (i.e., the response that would be obtained should the water surface be non-reflecting). Before discussing the details of the method, an overview of the method is believed to be in order. The method produces a conventional migration as well as a mirror migration, and then the method performs a joint deconvolution of these two images. A mirror migration is referred to as one which migrates from a duplicate set of receivers that are mirrored above the surface. The process is illustrated on a 2D synthetic dataset using a velocity model with a vertical gradient, an actual airgun wavelet to model the shots, and a variable depth streamer. The modelling of the shots may be done with a reflecting water surface (ghosted data). The shots with the ghost are processed through deterministic designature, migration, mirror migration, and joint deconvolution.

In the conventional migration, the primary events are perfectly stacked, while the imperfectly stacked ghost events are present in the form of a causal residual ghost wavelet (i.e., lagging the primaries). Conversely, in the mirror migration, the ghost events are perfectly stacked with their polarity reversed, whilst the imperfectly stacked primary events are present in the form of an anti-causal residual wavelet (i.e., the residual primaries precede the well imaged ghosts).

This dual imaging of the same reflectivity with two different viewpoints is used to extract the true amplitude deghosted migration. It is a reasonable assumption to consider a ghost wavelet as a minimum phase signal, or at least a marginally minimum phase signal. Likewise it can be considered that the mirror migration gives the same reflectivity as the migration but distorted by a wavelet which is maximum-phase. This can be considered as a binocular vision of the reflectivity with the conventional migration image colored by a normalized minimum phase distortion, and the mirror migration image colored by a normalized maximum phase distortion. To recover the reflectivity in true color (i.e., without distortion) a joint minimum phase, maximum phase deconvolution is applied on the migration and mirror migration.

Unlike conventional deconvolution, this is a well posed mathematical problem, which means it has a unique solution, even when the operators have perfect spectral notches. Therefore, there is no requirement for the usual assumption that the reflectivity is white; the amplitude spectrum of the reflectivity remains arbitrary.

The matched mirror migration and joint deconvolution deghosting technique is well suited to variable depth streamer acquisition. The technique is fully 3D as it makes no 2D assumptions and has no limitations in the cross-line direction, making it suitable for wide-azimuth as well as 3D surveys.

The process of gathering marine seismic data has been discussed in U.S. Provisional Patent Application No. 61/392, 982, Method and Device to Acquire Seismic Data, and thus, this process is not repeated herein. Further, the above-identified patent application identified the possibility to gather data not only by using traditional streamers, i.e., the detectors lying along horizontal lines or along a slanted line, but also using novel streamers in which part of the detectors may lie on a curved profile (variable depths) or streamers that have multiple slanted sections.

Figure 3:
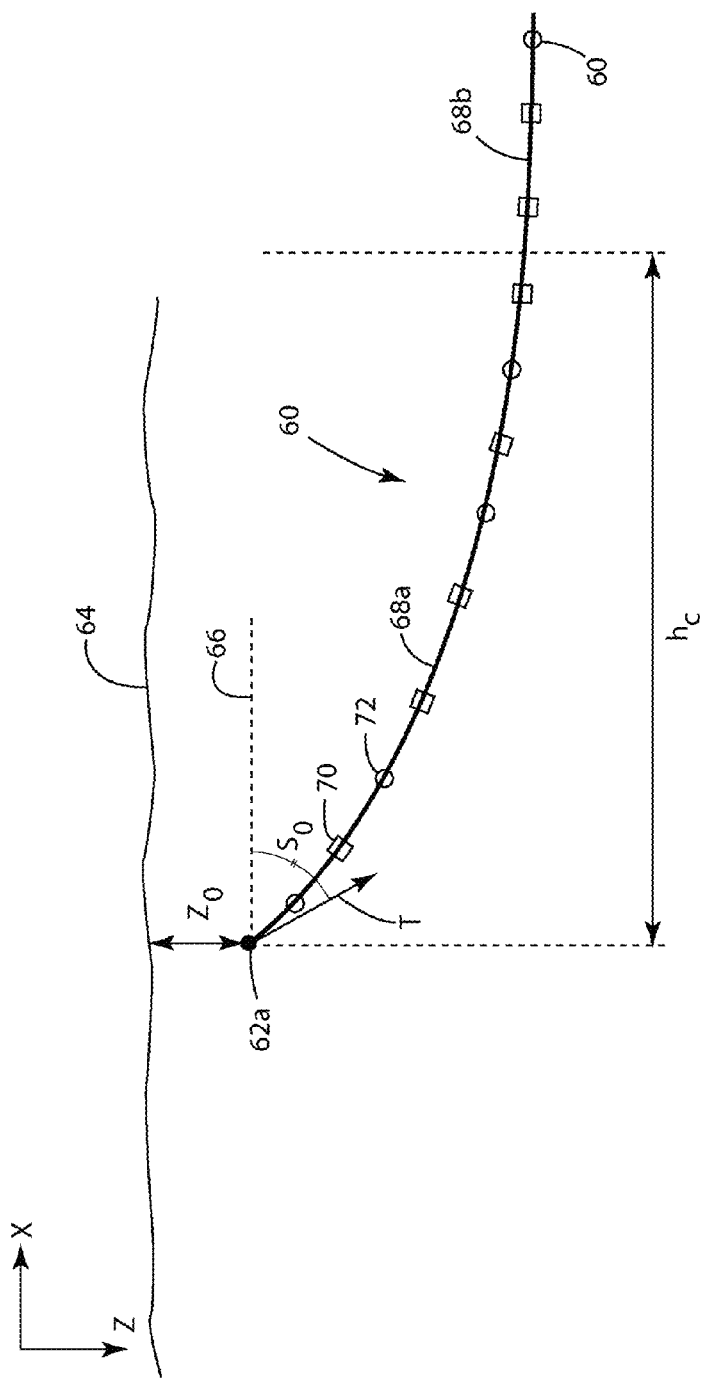
FIG. 3 is a schematic diagram of a seismic data acquisition system having a curved profile streamer.

Such configuration is illustrated in FIG. 3, in which a streamer 60 has a curved profile defined by three parametric quantities, $z_0$, $s_0$ and $h_c$. It is noted that not the entire streamer has to have the curved profile. In other words, the curved profile should not be construed to always apply to the entire length of the streamer. While this situation is possible, the exemplary embodiments do not prohibit having the curved profile applied to only a portion of the streamer. The first parameter $z_0$ indicates the depth of the first detector 54a relative to the surface 58 of the water. This parameter may have a value in the range of meters to tens of meters. For example, $z_0$ may be around 6 m. However, as would be recognized by those skilled in the art, the value of $z_0$ depends on each application and may be related to the depth of the bottom of the ocean, the depth of the reflectors, the power of the sound source, etc.

The second parameter $s_0$ is related to the slope of the initial part of the streamer 52 relative to a horizontal line 64. The angle $s_0$ is illustrated in FIG. 3 and it is determined by a tangent T to an initial part of the streamer and the horizontal line 64. It is noted that the slope of the curved profile at point 54a is given by a ratio of the change of the curved profile along the Z axis with respect to the change along the X axis. The slope is thus equal to the mathematical value of the tangent of the angle $s_o$, i.e., slope (at point 54a in FIG. 3)=tan($s_0$). Further, it is noted that for small angles (e.g., five or less degrees), tan($s_0$) is approximately equal to $s_o$, if the angle is expressed in radians and not in degrees. Thus, for small angles, the slope and the angle may be used interchangeably. In one embodiment, the value of $s_0$ may be between 0 and 6 degrees. The example shown in FIG. 3 has an initial angle $s_0$ equal to substantially 3 degrees. It is noted that the profile of the streamer 52 in FIG. 3 is not drawn to scale as an angle of 3 degrees is a relatively small quantity.

The third parameter $h_c$ indicates a horizontal length (distance along the X axis in FIG. 3 measured from the first detector 54a) of the curved portion of the streamer. This parameter may be in the range of hundreds to thousands of meters. For example, $h_c$ is around 3000 m for the configuration shown in FIG. 3. This parameter defines the end of the curved part of the streamer 52. In other words, the streamer 52 may have a first portion 52a that has a first curved profile and a second portion 52b that is either flat or has a different curved profile. Parameter $h_c$ defines the first portion 52a. It is noted that in one application the streamer 52 has both the first portion 52a and the second portion 52b while in another application the streamer 52 has only the first portion 52a. In other words, in some embodiments, the streamer does not extend along the entire curved profile, i.e., a length of the streamer projected on X axis is less than $h_c$.

According to another exemplary embodiment, the curved profile of the streamer 60 may be described, approximately, by the following equations:

$$z(h) = z_0 + s_0 h \left(1 - 0.5\left(\frac{h}{h_c}\right)\right) \text{ for } h \le h_c, \text{ and} \quad (1)$$

$$z(h) = z_0 + s_0 \cdot 0.5 \cdot h_c \text{ for } h > h_c. \quad (2)$$

In these equations, z is measured along the Z axis and h is measured along the X axis, where Z is perpendicular to the surface of the water and X extends along the surface of the water. Also, it is noted that only equation (1) may be enough to define the shape of the streamer, depending on the length of the streamer. In other words, in some embodiments, the streamer does not have to have the flat portion. For these specific equations, it was found that the clarity of the images of the sub-surface improve substantially. Those skilled in the art would understand that the values provided by equations (1) and (2) are approximate as the detectors 70 are under constant motion exerted by various water currents and the movement of the vessel. In other words, it is understood that detectors that are provided substantially on the curved profile described by equation (1) and/or (2), e.g., at positions as close as 10 to 20% to the real curve in terms of the actual depth z(h), are envisioned to be covered by the above mentioned equations. The same is true for birds 72 that are configured to maintain the curved profile. The curved profile may be one of a parabola, a circle, a hyperbola or a combination of these shapes.

Although the curved profile streamer discussed above provides better results than the existing streamer profiles, the processing discussed in the following exemplary embodiments equally applies to the traditional streamer profiles (e.g., horizontal, slanted).

Figure 4:
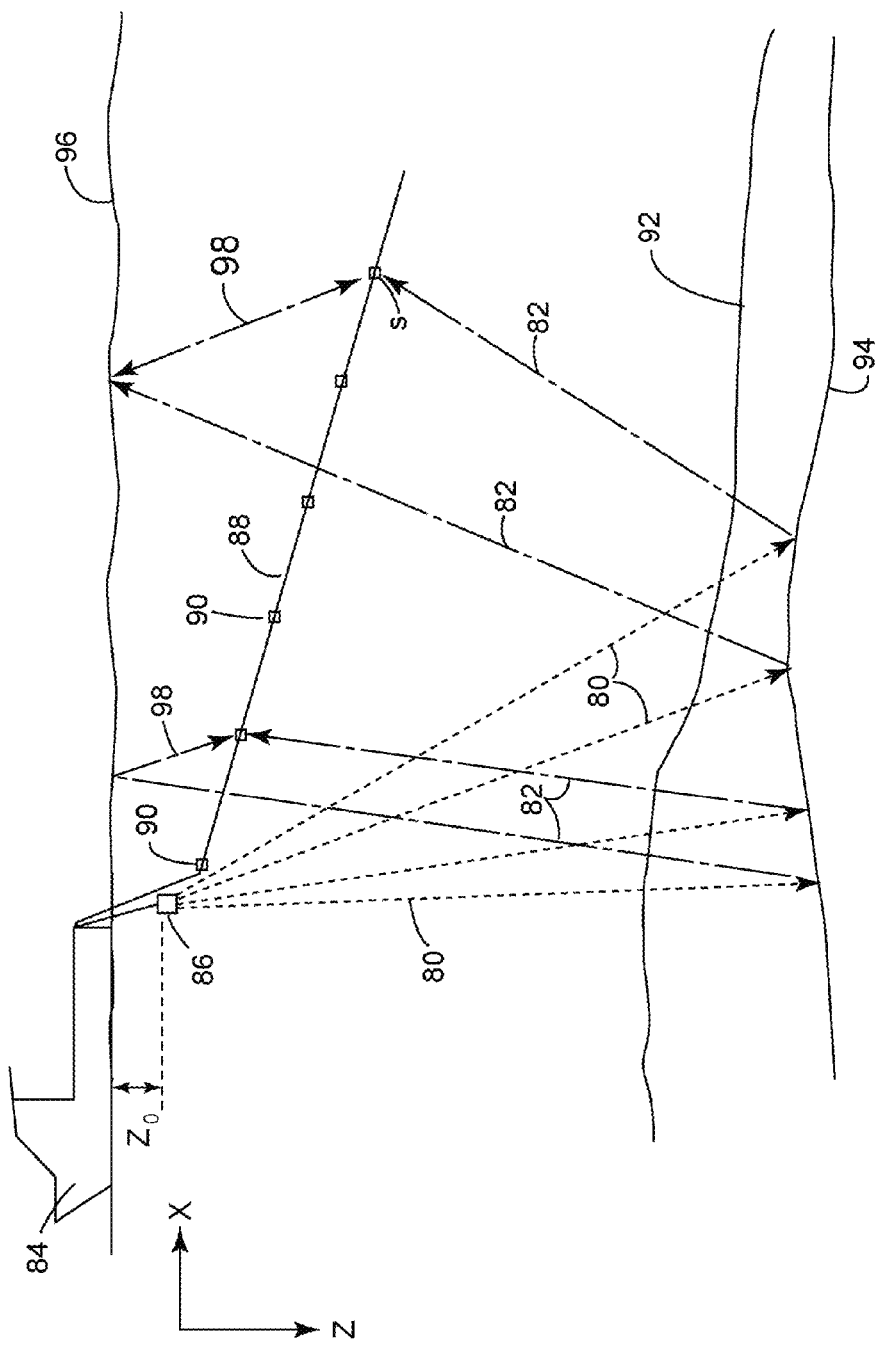
FIG. 4 illustrates down-travelling and up-travelling waves produced by a source and recorded by plural detectors.

Prior to discussing the novel deghosting process, providing a few definitions and concepts related to seismic data processing is believed to be in order. For this purpose, FIG. 4 illustrates an acquisition set up to be used as an example. As discussed later, another set up may be used.

FIG. 4 illustrates a vessel 84 having an acoustic source 86 and towing a streamer 88. The streamer 88 includes plural detectors 90 and the detectors are distributed, in this exemplary embodiment, on a slanted streamer. The incident waves 80 reach the bottom 92 of the ocean, where part of them are reflected. However, part of the incident waves continue to travel into the subsurface (structure under bottom 92) where it is reflected by various reflectors 94. At this point, a reflected wave 82 starts to propagate towards the surface 96 of the water. This reflected wave 82 travelling upwards is recorded by detectors 90. However, the reflected wave 82 further travels to the surface 96, where it is reflected by the surface of the water, thus forming the ghosts 98, which also are recorded by the detectors 90.

The incident wave 80 (i.e., the wave emitted by the source 86) is assumed to be down-travelling and described by a mathematical function D. This incident wave D(x, y, z, t) depends on the position (x, y, z) and time t at any point in space. The incident wave D(x, y, z, t) is synthesized recursively at depth z during the migration process. The down-travelling wave is being initialized at a depth of the seismic source $z_s$. Considering that there are n detectors, with n from 1 to N, where N is a natural number, the incident wave D at every depth n$\Delta$z is then calculated recursively by calculating the incident wave D(x, y, z+$\Delta$z, t) at a depth z+$\Delta$z from the incident wave D(x, y, z, t) at depth z. This is performed until all the detectors of the streamer are taken into account.

Similarly, the reflected wave 82, which is described by a mathematical function U(x, y, z, t), is assumed to be up-travelling and it is initialized at a depth z=$z_r$, where $z_r$ is a depth of the detectors if all the detectors have the same depth. If the detectors are distributed on a slanted streamer or a streamer having a curved profile, the function U needs to be adjusted for each detector as discussed later. The reflected wave U in an entire volume is then calculated recursively by calculating the up-travelling wave U(x, y, z+$\Delta$z, t) at a depth z+$\Delta$z from the up-travelling wave U(x, y, z, t) at a depth z.

The depths of the detectors, i.e., the fact that the source and the detectors may have non-zero depths relative to each other may be taken into account by adding the sources and the detectors at a corresponding z throughout the recursive calculations. For example, a detector provided at a depth $z_r$, lying between n$\Delta$z and (n+1)$\Delta$z is added during the recursive calculation of U((n+1)$\Delta$z) from U(n$\Delta$z).

In the case of a mirror migration, the surface of the water is used as a mirror: instead of "looking" toward the sea bottom, one "looks" toward the surface of the water to see the reflectors located below the seismic receivers. The mirror migration is described in French filed patent application serial no. FR1050278, having the title "Method to Process Marine Seismic Data", and U.S. Provisional Patent Application No. 61/393,008, entitled Method and Device for Processing Seismic Data, the entire content of which are incorporated herein by reference. The same applications also describe a matched mirror migration.

Once the migration is carried out, an image d(x, y, z) is obtained that includes residual ghost waves. If the image is obtained by using the matched mirror migration method, the residual ghosts are symmetric. The image d(x, y, z) may be considered to be equal to the reflectivity r(x, y, z) convoluted in z with a residual ghost transfer function g(z) as expressed by the following equation:

$$d(x,y,z)=g(z) \cdot r(x,y,z).$$

As the residual ghost transfer function g(z) depends only weakly on a position (x, y, z), the above relation is valid within a given volume.

The operation of estimating the reflectivity r(x, y, z) from the data d(x, y, z) is called deconvolution. This operation needs an estimate of the transfer function g(z). Two processes are known to those skilled in the art for estimating the transfer function g(z) and calculating the reflectivity r(x, y, z) from data d(x, y, z).

One process is the Zero-phase deconvolution with white reflectivity. This process assumes that g(z) is symmetric in z and that the reflectivity has a white autocorrelation in z (equal to an impulse at z=0). A Fourier transform $G(k_z)$ of g(z) is real, and a Fourier transform $R(x, y, k_z)$ of r(x, y, z) is complex with modulus 1. From here, it can be derived that $G(k_z)$ is the modulus of $D(x, y, k_z)$, the Fourier transform in z of d(x, y, z).

The other process is the Minimum-phase deconvolution with white reflectivity. This process assumes that g(z) is a minimum-phase and that the reflectivity has a white autocorrelation in z.

The zero-phase deconvolution makes possible the deconvolution of the matched mirror migration (because in that case g(z) is symmetrical) and the minimum-phase deconvolution allows the deconvolution of the standard migration, because for the migration process the residual ghost transfer function is causal and can be considered minimum-phase. Independent of which of the two procedures is used for obtaining the reflectivity (migration followed by minimum-phase deconvolution or matched mirror migration followed by zero-phase deconvolution), the assumption of white reflectivity is necessary for the traditional processes. This assumption was commonly used in seismic processing, but is used less and less because the so-called preserved-amplitude processing is becoming more and more the standard. In this type of processing, it is not only the position of the reflectors that is of interest, but also their amplitude, and in this context the assumption of white reflectivity cannot be used.

Figure 5:
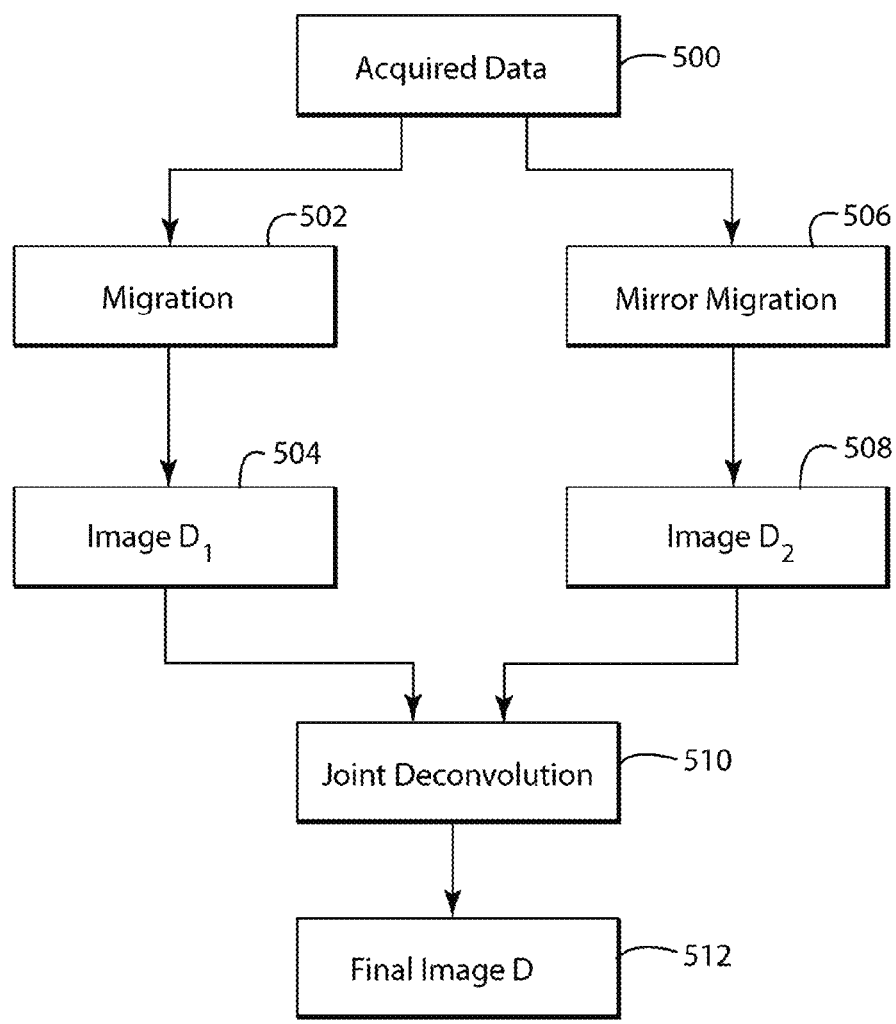
FIG. 5 is a flow chart of a method for generating a final image of a subsurface according to an exemplary embodiment.

According to an exemplary embodiment illustrated in FIG. 5, a novel processing method does not require the assumption of white reflectivity and preserves the amplitude. In step 500, data acquired, for example, with the set up shown in FIG. 4, is input to a processing apparatus. In step 502, the migration process is applied to the input data for generating, in step 504, an image $d_1$. Similarly, the same data from step 500 may be processed with a mirror migration procedure in step 506 to generate in step 508 an image $d_2$. In one application, no deghosting is applied to the input data of step 500 before steps 504 and 508. The image $d_1(x, y, z)$ is obtained by migration (where a recording of each receiver is inserted at their true position $(x_r, y_r, z_r)$) and the image $d_2(x, y, z)$ is obtained by mirror migration (where a recording of each receiver is inserted with a change of sign only at the receiver's mirror position $(x_r, y_r, -z_r)$).

Figure 6:
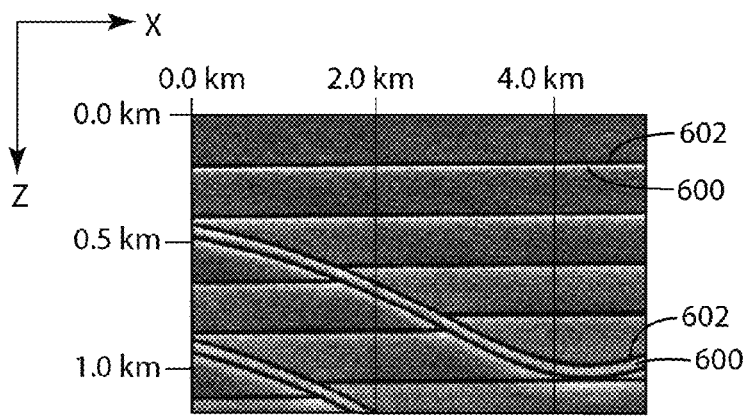
FIG. 6 is a plot illustrating data processed by a migration procedure.

The migration aligns the primary events so that a coherent summation of the primary events is possible and it is shown in FIG. 6. The migration makes the ghost events to correspond to z positions (on the Z axis in FIG. 4) greater than the corresponding primary events. This is illustrated in FIG. 6 by the white areas 600 following each line 602. Therefore, the image $d_1(x, y, z)$ includes residual ghost waves which are represented by a causal, minimum phase transfer function $g_{min}(Z)$, which contaminates by convolution the reflectivity $r(x, y, z)$ as shown in equation (3):

$$d_1(x,y,z) = g_{min}(z) \cdot r(x,y,z). \tag{3}$$

The minimum phase transfer function $g_{min}(z)$ is a causal function and its inverse is also causal.

Figure 7:
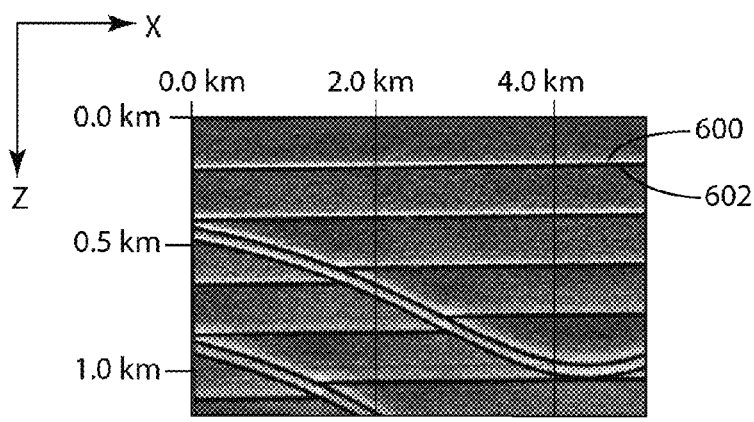
FIG. 7 is a plot illustrating data processed by a mirror migration procedure.

The mirror migration aligns the ghost events by changing their sign to make their polarity correspond to that of the primary events. Then, a coherent summation of the ghost events is possible and it is shown in FIG. 7. The primary events correspond in this case, as shown in FIG. 7, to z positions smaller than the corresponding ghost events. FIG. 7 shows the white areas 600 being distributed above (on the Z axis) the lines 602. The image $d_2(x, y, z)$ includes residual ghost waves which are represented by an anticausal, maximum phase transfer function $g_{max}(z)$, which contaminates by convolution the reflectivity $r(x, y, z)$ as shown in equation (4):

$$d_2(x,y,z) = g_{max}(z) * r(x,y,z) \tag{4}$$

The maximum phase transfer function is an anticausal function and its inverse is also anticausal.

In other words, the migration stacks coherently the primary events, the ghosts events being imperfectly stacked in such a way that the migration has a residual ghost wavelet that is causal. The mirror migration stacks coherently the ghosts events with their polarity reversed, in such a way that the mirror migration has a residual ghost wavelet that is anticausal. In an exemplary embodiment, the deghosting method illustrated in FIG. 5 uses a "binocular view" of two images ($d_1$ and $d_2$) of the same reflectivity r with a different viewpoint to extract a true amplitude deghosted migration that would have been obtained by a conventional migration if the water-surface was non-reflective.

Figure 8:
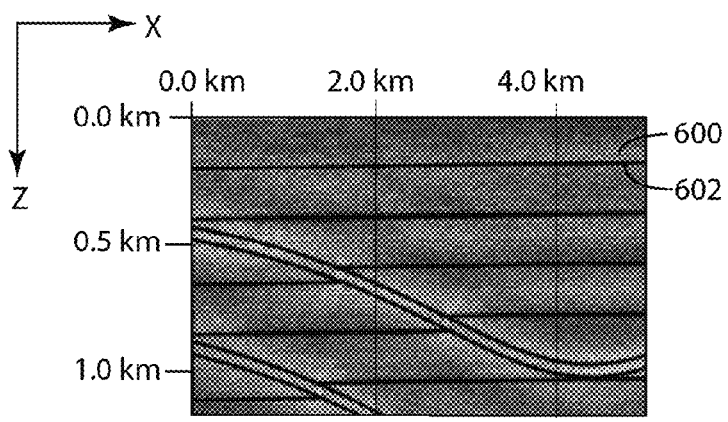
FIG. 8 is a plot illustrating data processed by a novel procedure according to an exemplary embodiment.

After calculating $d_1(x, y, z)$ and $d_2(x, y, z)$ by migration and mirror migration in steps 504 and 508, respectively, the reflectivity $r(x, y, z)$ may be obtained by a "joint deconvolution" procedure performed in step 510 (see FIG. 5). Joint deconvolution refers to a calculation procedure allowing the reflectivity $r(x, y, z)$, a causal operator $g_{min}(z)$, and an anti-causal operator $g_{max}(z)$ to be obtained from images $d_1(x, y, z)$ and $d_2(x, y, z)$ in such a way that equations (3) and (4) are satisfied, exactly or approximately, within a certain computational volume V. More specifically, the causal operator $g_{min}(z)$ is a minimum phase operator, and the anticausal operator $g_{max}(z)$ is a maximum phase operator. A minimum phase operator or a maximum phase operator are known in control theory. For example, the minimum phase operator has the property that it is causal and stable and its inverse is causal and stable. The maximum phase operator is causal and stable and its inverse is causal and unstable. After the joint deconvolution step 510, a final image "d" of the subsurface is generated in step 512. The final image d is illustrated in FIG. 8 and it can be seen that white areas 600 are greatly reduced relative to FIGS. 6 and 7 that use the conventional approach.

Figure 9:
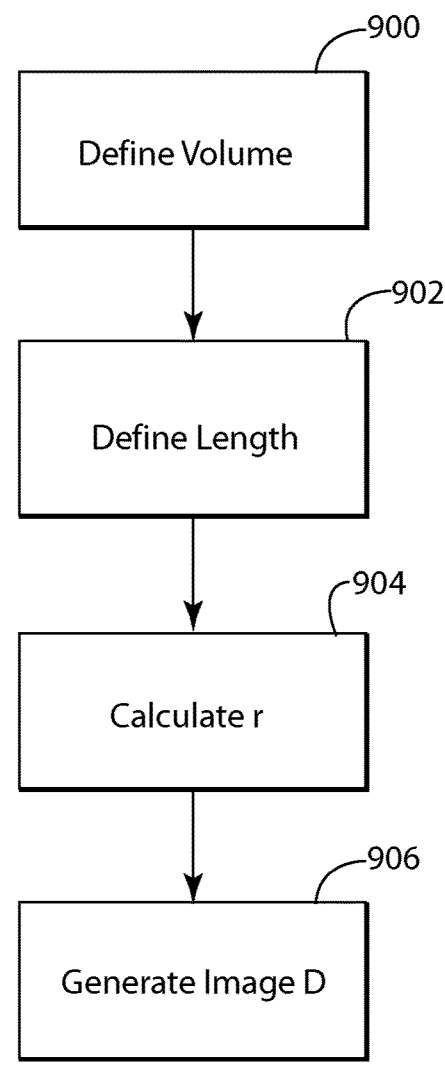
FIG. 9 is a flow chart illustrating a method for calculating a final image of a subsurface according to an exemplary embodiment.

According to an exemplary embodiment illustrated in FIG. 9, a joint deconvolution procedure includes a step 900 of defining a volume $V = [x_{min}, x_{max}] \times [y_{min}, y_{max}] \times [z_{min}, z_{max}]$ and a step 902 of defining a length Dz which depends on a maximum separation between an event and its ghost. Further, the procedure includes a step 904 of calculating $g_{min}(z)$, $g_{max}(z)$ and $r(x, y, z)$ by considering that r is being defined on volume V, $g_{min}(z)$ on the interval [0, Dz] with a normalization $g_{min}(z=0)=1$, $g_{max}(z)$ on the interval [-Dz, 0] with a normalization $g_{max}(z=0)=1$. The calculating step 904 is achieved by minimizing a cost function C defined by:

$$C = \Sigma_{(x,y,z) \in V} \{[d_1(x,y,z) - g_{min}(z)*r(x,y,z)]^2 + [d_2(x,y,z) - g_{max}(z)*r(x,y,z)]^2\}.$$

The reflectivity $r(x, y, z)$ is being calculated over an entire volume of interest by juxtaposing the $r(x, y, z)$ calculated on volume V with an overlapping zone. It is also possible to use the characteristics of the minimum phase of $g_{min}(z)$ and the maximum phase of $g_{max}(z)$. Based on the calculated r, a final image is generated in step 906.

Another exemplary embodiment includes replacing the functions $g_{min}(z)$ and $g_{max}(z)$ that depend only on "z" with three-dimensional functions $g_{min}(x, y, z)$ and $g_{max}(x, y, z)$ which are causal in z and anticausal in z, respectively. In addition, the one dimension convolution in z may be replaced by a three dimension convolution. This embodiment makes it possible to take into account the dependence of the residual ghosts of the waves' angles of propagation.

In still another exemplary embodiment, which also makes it possible to take into account the dependence of the residual ghosts on the angles of propagation, a transform called a ($\tau$, $p_x$, $p_y$) transform is applied to $d_1(x, y, z)$ and $d_2(x, y, z)$, which transforms the data $d_1(x, y, z)$ into $D_1(p_x, p_y, \tau)$ and the data $d_2(x, y, z)$ into $D_2(p_x, p_y, \tau)$. A definition of the ($\tau$, $p_x$, $p_y$) transform, also called "slant stack," can be found, for example, in *Seismic Data Processing*, Ozdogan Yilmaz, Society of Exploration Geophysicists 1987, chapter 7, page 429, or in U.S. Pat. No. 6,574,567, the entire content of which are incorporated herein by reference.

Next, for all values $(p_x, p_y)$, the residual ghosts $G_{min}(p_x, p_y)(\tau)$ and $G_{max}(p_x, p_y)(\tau)$ are calculated assuming to be respectively causal and anticausal in $\tau$, minimum and maximum phase in $\tau$, and a reflectivity $R(p_x, p_y, \tau)$ such that:

$$C(p_x,p_y)=\Sigma\{[D_1(p_x,p_y,\tau)-G_{min}(p_x,p_y)(\tau)*R(p_x,p_y,\tau)]^2+[D_2(p_x,p_y,\tau)-G_{max}(p_x,p_y)(\tau)*R(p_x,p_y,\tau)]^2\}$$

is a minimum for all $(p_x, p_y)$, the "*" operation being in this case a convolution in $\tau$. The deghosted image, i.e., the reflectivity $r(x, y, z)$, is obtained by calculating the inverse of $R(p_x, p_y, \tau)$ with the transformation $(\tau, p_x, p_y)$.

In the above description, the migrations used are depth migrations for the images $d_1(x, y, z)$ and $d_2(x, y, z)$. The joint deconvolution procedure can also be used with images resulting from time migrations. In the case of a time migration, the image $d(x, y, \tau)$ has a temporal parameter $\tau$ replacing the depth parameter $z$. For the time migration, a velocity model $v_1(x, y, \tau)$ is used for performing the coherent summation of the primary events. The equivalent for a time mirror migration processing is a migration where, after changing the polarity of the input data, a velocity $v_2(x, y, \tau)$ is used for performing a coherent summation of the ghost events. Then, a joint deconvolution can be applied to calculate the final image of the subsurface and the joint deconvolution is described by:

$$d_1(x,y,\tau)=g_{min}(\tau)*r(x,y,\tau) \text{ and } d_2(x,y,\tau)=g_{max}(\tau)*r(x,y,\tau).$$

The joint deconvolution step may be generalized to deconvolve more than two sets of data, particularly in the case where the receivers are of different types. For example, if pressure-sensitive receivers such as hydrophones and geophone receivers are used together on the same streamer or on different streamers, a more complex deconvolution is necessary for obtaining the final image. For example, assume that the result of the migration is $d_1(x, y, z)$ and the result of the mirror migration is $d_2(x, y, z)$ for hydrophone type receivers and the result of the migration is $d_3(x, y, z)$ and the result of the mirror migration is $d_4(x, y, z)$ for geophones. The mirror migration of geophone data is achieved by inserting the recordings of each receiver (geophone) at their mirror positions $(x_r, y_r, -z_r)$ but without changing the sign for a vertical geophone and with a changed sign for a horizontal geophone receiver.

Joint deconvolution with four inputs is obtained by modeling the migrations and mirror migrations with the following equations:

$$d_1(x,y,z)=g^h_{min}(z)*r(x,y,z);$$

$$d_2(x,y,z)=g^h_{max}(z)*r(x,y,z);$$

$$d_3(x,y,z)=g^g_{min}(z)*c(z)*r(x,y,z); \text{ and}$$

$$d_4(x,y,z)=g^g_{max}(z)*c(z)*r(x,y,z).$$

Then, by using a least squares type cost function, the causal and minimum phase operators $g^h_{min}(z)$ and $g^g_{min}(z)$, the anticausal and maximum phase operators $g^h_{max}(z)$ and $g^g_{max}(z)$, the calibration operator $c(z)$ as well as the reflectivity $r(x, y, z)$ may be determined from the migrations and mirror migrations images $d_1(x, y, z)$, $d_2(x, y, z)$, $d_3(x, y, z)$ and $d_4(x, y, z)$.

The cost function can be weighted so as to take into account the different noise spectra of the hydrophone sensors and the geophone sensors. For example, in time migration, the cost function to be minimized is written in the f domain, the Fourier transform of $\tau$:

$$C=\Sigma\{[d_1(x,y,f)-g^h_{min}(f)\cdot r(x,y,f)]^2/B^h(f)+[d_2(x,y,f)-g^h_{max}(f)\cdot r(x,y,f)]^2/B^h(f)\}\cdot\{[d_3(x,y,f)-g^g_{min}(f)\cdot c(f)\cdot r(x,y,f)]^2/B^g(f)+[d_4(x,y,f)-g^g_{max}(f)\cdot c(f)\cdot r(x,y,f)]^2/B^g(f)\},$$

where $B^h(f)$ and $B^g(f)$ are estimates of the power spectra of the hydrophone and geophone noise, respectively.

The procedures described above are not limited to the processing of data acquired using linear streamers with a constant slope as shown in FIG. 1. The above discussed procedures are also applicable to data acquired using streamers each having several sections with different slopes, or streamers having one or more sloped sections and one or more horizontal sections, or horizontal streamers located at different depths or streamers having a curved profile.

Figure 10:
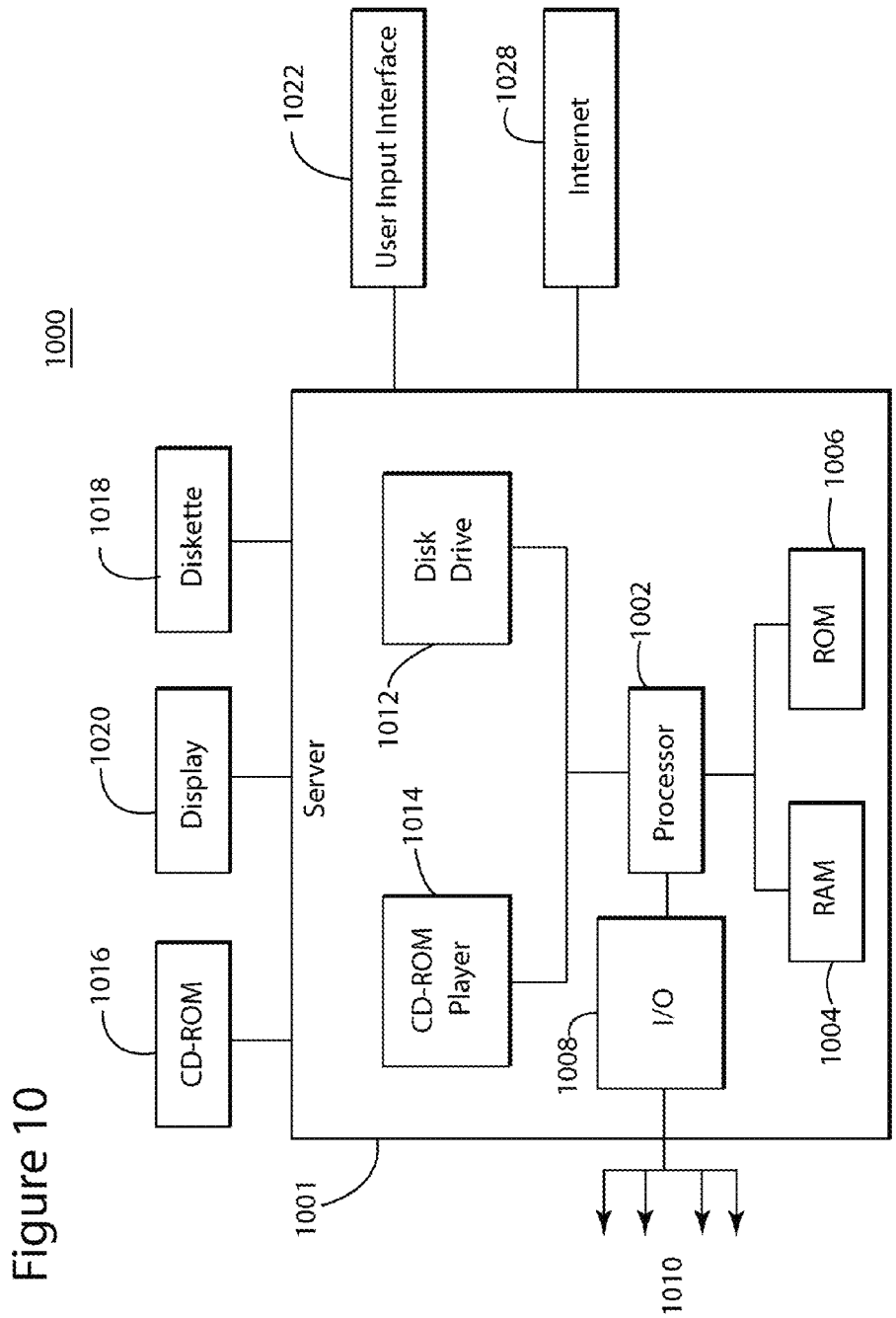
FIG. 10 is a schematic diagram of a processing apparatus configured to perform a novel method according to an exemplary embodiment.

The above discussed procedures and methods may be implemented in a processing apparatus illustrated in FIG. 10. Hardware, firmware, software or a combination thereof may be used to perform the various steps and operations described herein. The processing apparatus 1000 of FIG. 10 is an exemplary computing structure that may be used in connection with such a system.

The exemplary processing apparatus 1000 suitable for performing the activities described in the exemplary embodiments may include a server 1001. Such a server 1001 may include a central processor (CPU) 1002 coupled to a random access memory (RAM) 1004 and to a read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like. The processor 1002 carries out a variety of functions as is known in the art, as dictated by software and/or firmware instructions.

The server 1001 may also include one or more data storage devices, including hard and floppy disk drives 1012, CD-ROM drives 1014, and other hardware capable of reading and/or storing information such as DVD, etc. In one embodiment, software for carrying out the above discussed steps may be stored and distributed on a CD-ROM 1016, diskette 1018 or other form of media capable of portably storing information. These storage media may be inserted into, and read by, devices such as the CD-ROM drive 1014, the disk drive 1012, etc. The server 1001 may be coupled to a display 1020, which may be any type of known display or presentation screen, such as LCD displays, plasma display, cathode ray tubes (CRT), etc. A user input interface 1022 is provided, including one or more user interface mechanisms such as a mouse, keyboard, microphone, touch pad, touch screen, voice-recognition system, etc.

The server 1001 may be coupled to other devices, such as sources, detectors, etc. The server may be part of a larger network configuration as in a global area network (GAN) such as the Internet 1028, which allows ultimate connection to the various landline and/or mobile computing devices.

Figure 11:
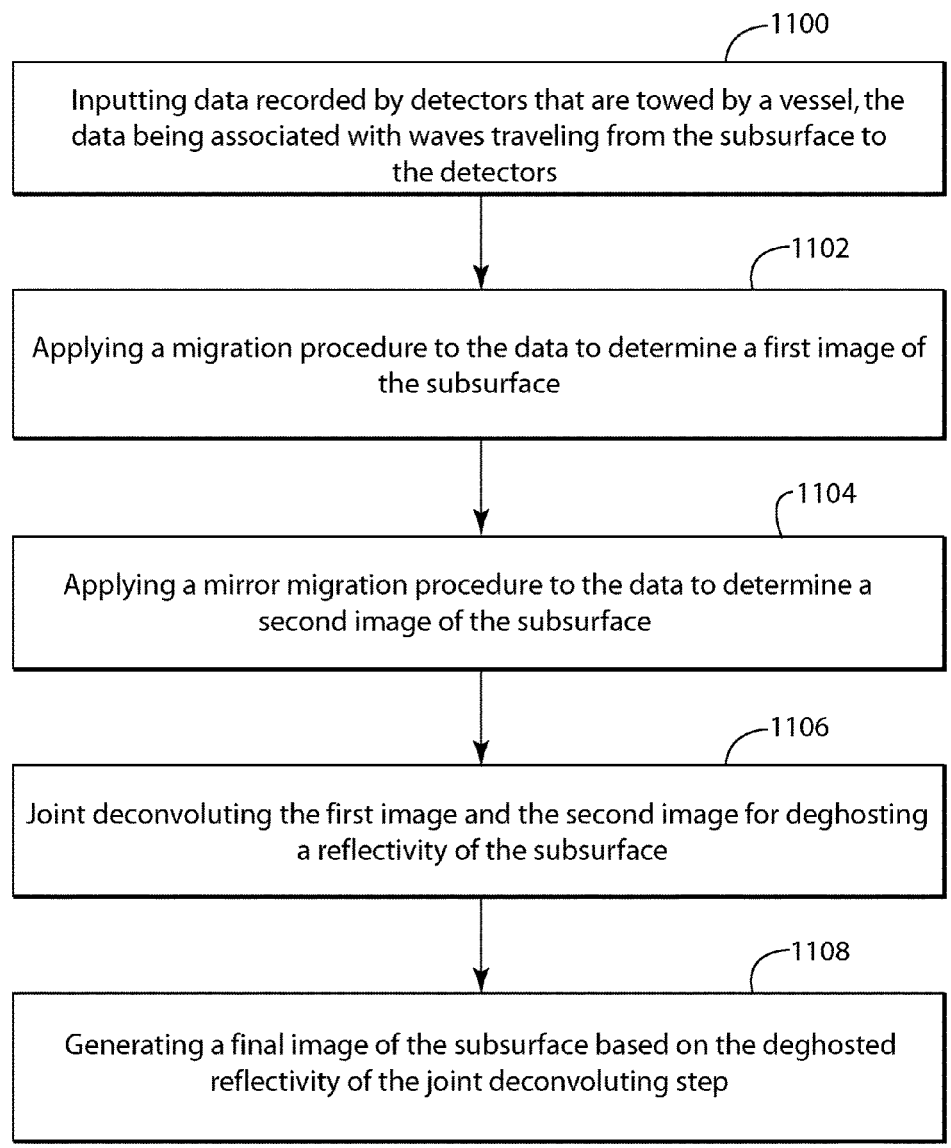
FIG. 11 is a flow chart illustrating a method for deghosting according to an exemplary embodiment.
Figure 3:
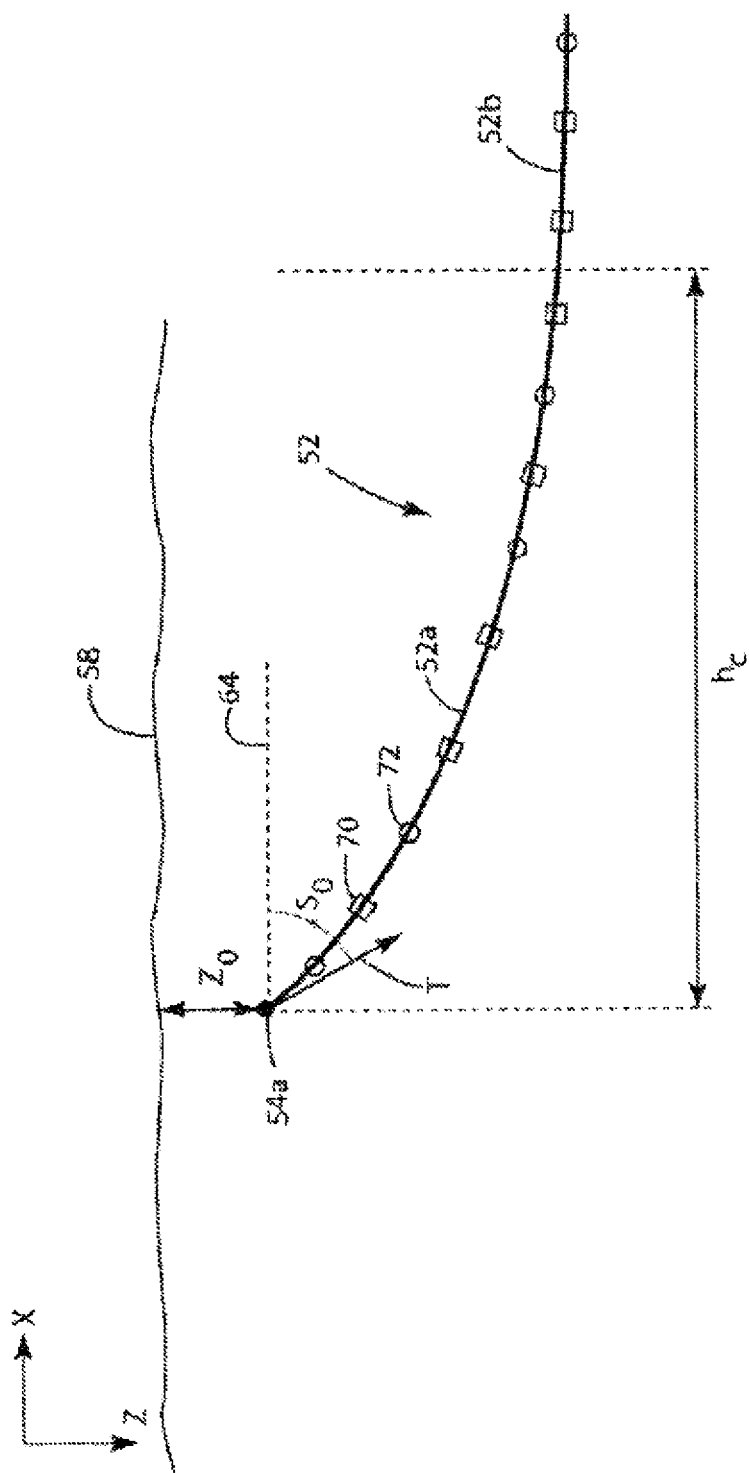

According to an exemplary embodiment illustrated in FIG. 11, there is a method for deghosting seismic data related to a subsurface of a body of water. The method includes a step 1100 of inputting data recorded by detectors that are towed by a vessel, the data being associated with waves travelling from the subsurface to the detectors; a step 1102 of applying a migration procedure to the data to determine a first image of the subsurface; a step 1104 of applying a mirror migration procedure to the data to determine a second image of the subsurface; a step 1106 of joint deconvoluting the first image and the second image for deghosting a reflectivity of the subsurface; and a step 1108 of generating a final image of the subsurface based on the deghosted reflectivity of the joint deconvoluting step.

The disclosed exemplary embodiments provide an apparatus and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for deghosting seismic data related to a subsurface of a body of water, the method comprising:
   receiving data recorded with seismic detectors that are towed by a vessel, the data being associated with waves travelling from the subsurface to the seismic detectors;
   applying with a processing apparatus a migration procedure to the data to determine a first image of the subsurface;
   applying with the processing apparatus a mirror migration procedure to the data to determine a second image of the subsurface;
   joint deconvoluting with the processing apparatus the first image and the second image for deghosting a reflectivity of the subsurface; and
   generating with the processing apparatus a final image of the subsurface based on the deghosted reflectivity of the joint deconvoluting step.

2. The method of claim 1, wherein the deghosting is performed during an imaging phase and not in a preprocessing phase with a processing apparatus.

3. The method of claim 1, wherein no datuming step is performed on the data.

4. The method of claim 1, wherein a travelling angle of the waves propagating from the subsurface to the detectors or from a surface of the water to the detectors is not restricted.

5. The method of claim 1, wherein the data is three dimensional data and the migration, the mirror migration and the joint deconvolution are three dimensional procedures.

6. The method of claim 1, wherein the data are collected from streamers having birds that are controlled to achieve a curved profile.

7. The method of claim 1, wherein the migration procedure comprises:
   recursively synthesizing an incident wave $D(x, y, z+\Delta z, t)$ at a depth $z+\Delta z$ from a previous incident wave $D(x, y, z, t)$ at depth z.

8. The method of claim 1, wherein the mirror migration procedure comprises:
   recursively synthesizing an up-travelling wave $U(x, y, z+\Delta z, t)$ at a depth $z+\Delta z$ from a previous up-travelling wave $U(x, y, z, t)$ at a depth z.

9. The method of claim 1, wherein the joint deconvoluting comprises:
   determining the reflectivity $r(x, y, z)$, a minimum phase transfer function $g_{min}(z)$, and a maximum phase transfer function $g_{max}(z)$ based on equations:

$$d_1(x,y,z)=g_{min}(z) \cdot r(x,y,z), \text{ and}$$

$$d_2(x,y,z)=g_{max}(z)*r(x,y,z),$$

wherein z is a depth of a point relative to the surface of the water, and x and y are coordinates of the point in a plane substantially parallel with the surface of the water.

10. The method of claim 9, wherein the $g_{min}(z)$ and $g_{max}(z)$ are three dimensional functions.

11. The method of claim 1, wherein the migration is a depth migration.

12. The method of claim 1, wherein the migration is a time migration.

13. The method of claim 1, wherein the joint deconvolution comprises:
   calculating a cost function C for determining the reflectivity, wherein the cost function C is given by:

$$C=\Sigma_{(x,y,z)\in V}\{[d_1(x,y,z)-g_{min}(z)*r(x,y,z)]^2+[d_2(x,y,z)-g_{max}(z)*r(x,y,z)]^2\},$$

where $d_1(x, y, z)$ is the first image, $d_2(x, y, z)$ is the second image, $g_{min}(z)$ is a minimum phase transfer function, $g_{max}(z)$ is a maximum phase transfer function, z is a depth of a point relative to the surface of the water, x and y are coordinates of the point in a plane substantially parallel with the surface of the water, and V is a predetermined volume.

14. The method of claim 1, further comprising:
   applying a $(\tau, p_x, p_y)$ transform to the first image $d_1(x, y, z)$ and the second image $d_2(x, y, z)$, to transform the first image $d_1(x, y, z)$ into $D_1(p_x, p_y, \tau)$ and the data $d_2(x, y, z)$ into $D_2(p_x, p_y, \tau)$.

15. The method of claim 1, wherein the data includes recordings from hydrophones and geophones.

16. The method of claim 15, wherein a result of the migration procedure is $d_1(x, y, z)$ and a result of the mirror migration procedure is $d_2(x, y, z)$ for hydrophone type receivers and a result of the migration procedure is $d_3(x, y, z)$ and a result of the mirror migration procedure is $d_4(x, y, z)$ for geophones.

17. The method of claim 16, further comprising:
   generating the final image using a joint deconvolution of $d_1(x, y, z), d_2(x, y, z), d_3(x, y, z),$ and $d_4(x, y, z)$ and based on the following equations:

$$d_1(x,y,z)=g^h_{min}(z)*r(x,y,z);$$

$$d_2(x,y,z)=g^h_{max}(z)*r(x,y,z);$$

$$d_3(x,y,z)=g^g_{min}(z)*c(z)*r(x,y,z); \text{ and}$$

$$d_4(x,y,z)=g^g_{max}(z)*c(z)*r(x,y,z),$$

where $g^h_{min}$ and $g^g_{min}$ are minimum phase transfer functions, $g^h_{max}(z)$ and $g^g_{max}(z)$ are maximum phase transfer functions, z is a depth of a point relative to the surface of the water, x and y are coordinates of the point in a plane substantially parallel with the surface of the water, and c(z) is a calibration operator.

18. A processing device for deghosting seismic data related to a subsurface of a body of water, the processing device comprising:
an interface configured to receive data recorded by detectors that are towed by a vessel, the data being associated with waves travelling from the subsurface to the detectors; and
a processor connected to the interface and configured to,
apply a migration procedure to the data to determine a first image of the subsurface,
apply a mirror migration procedure to the data to determine a second image of the subsurface,
joint deconvolute the first image and the second image for deghosting a reflectivity of the subsurface, and
generate a final image of the subsurface based on the deghosted reflectivity of the joint deconvoluting step.

19. The processing device of claim 18, wherein the processor is configured to deghost the final image during an imaging phase and not in a preprocessing phase.

20. The processing device of claim 18, wherein the processor is configured to perform no datuming step on the data.

21. The processing device of claim 18, wherein the processor is configured to handle the waves propagating from the subsurface to the detectors or from a surface of the water to the detectors with a travelling angle having no restriction.

22. The processing device of claim 18, wherein the data is three dimensional data and the migration, the mirror migration and the joint deconvolution are three dimensional procedures.

23. The processing device of claim 18, wherein the data are collected from streamers having birds that are controlled to achieve a curved profile.

24. The processing device of claim 18, wherein the processor is configured to:
determine the reflectivity $r(x, y, z)$, a minimum phase transfer function $g_{min}(z)$, and a maximum phase transfer function $g_{max}(z)$ based on equations:

$$d_1(x,y,z)=g_{min}(z) \cdot r(x,y,z), \text{ and}$$

$$d_2(x,y,z)=g_{max}(z)*r(x,y,z),$$

wherein z is a depth of a point relative to the surface of the water, and x and y are coordinates of the point in a plane substantially parallel with the surface of the water.

25. The processing device of claim 24, wherein the $g_{min}(z)$ and $g_{max}(z)$ are three dimensional functions.

26. The processing device of claim 18, wherein the migration is a depth migration.

27. The processing device of claim 18, wherein the migration is a time migration.

28. The processing device of claim 18, wherein the processor is configured to execute the joint deconvolution by:
calculating a cost function C for determining the reflectivity, wherein the cost function C is given by:

$$C=\Sigma_{(x,y,z)\in V}\{[d_1(x,y,z)-g_{min}(z)*r(x,y,z)]^2+[d_2(x,y,z)-g_{max}(z)*r(x,y,z)]^2\},$$

where $d_1(x, y, z)$ is the first image, $d_2(x, y, z)$ is the second image, $g_{min}(z)$ is a minimum phase transfer function, $g_{max}(z)$ is a maximum phase transfer function, z is a depth of a point relative to the surface of the water, x and y are coordinates of the point in a plane substantially parallel with the surface of the water, and V is a predetermined volume.

29. The processing device of claim 18, wherein the processor is further configured to:
apply a $(\tau, p_x, p_y)$ transform to the first image $d_1(x, y, z)$ and the second image $d_2(x, y, z)$, to transform the first image $d_1(x, y, z)$ into $D_1(p_x, p_y, \tau)$ and the data $d_2(x, y, z)$ into $D_2(p_x, p_y, \tau)$.

30. The processing device of claim 18, wherein the data includes recordings from hydrophones and geophones.

31. The processing device of claim 30, wherein a result of the migration procedure is $d_1(x, y, z)$ and a result of the mirror migration procedure is $d_2(x, y, z)$ for hydrophone type receivers and a result of the migration procedure is $d_3(x, y, z)$ and a result of the mirror migration procedure is $d_4(x, y, z)$ for geophones.

32. The processing device of claim 31, wherein the processor is further configured to:
generate the final image using a joint deconvolution of $d_1(x, y, z), d_2(x, y, z), d_3(x, y, z),$ and $d_4(x, y, z)$ and based on the following equations:

$$d_1(x,y,z)=g^h_{min}(z)*r(x,y,z);$$

$$d_2(x,y,z)=g^h_{max}(z)*r(x,y,z);$$

$$d_3(x,y,z)=g^g_{min}(z)*c(z)*r(x,y,z); \text{ and}$$

$$d_4(x,y,z)=g^g_{max}(z)*c(z)*r(x,y,z),$$

where $g^h_{min}$ and $g^g_{min}$ are minimum phase transfer functions, $g^h_{max}(z)$ and $g^g_{max}(z)$ are maximum phase transfer functions, z is a depth of a point relative to the surface of the water, x and y are coordinates of the point in a plane substantially parallel with the surface of the water, and $c(z)$ is a calibration operator.

33. A non-transitory computer readable medium including computer executable instructions, wherein the instructions, when executed, implement a method for deghosting seismic data related to a subsurface of a body of water, the method comprising:
inputting data recorded by detectors that are towed by a vessel, the data being associated with waves travelling from the subsurface to the detectors;
applying a migration procedure to the data to determine a first image of the subsurface;
applying a mirror migration procedure to the data to determine a second image of the subsurface;
joint deconvoluting the first image and the second image for deghosting a reflectivity of the subsurface; and
generating a final image of the subsurface based on the deghosted reflectivity of the joint deconvoluting step.

* * * * *

UNITED STATES PATENT AND TRADEMARK OFFICE
CERTIFICATE OF CORRECTION

| | | |
|---|---|---|
| PATENT NO. | : 8,451,682 B2 | |
| APPLICATION NO. | : 13/155778 | |
| DATED | : May 28, 2013 | |
| INVENTOR(S) | : Soubaras | |

It is certified that error appears in the above-identified patent and that said Letters Patent is hereby corrected as shown below:

In the Drawings

Delete Sheet 3 of 9 consisting of Fig. 3 and replace with sheet 3 consisting of Fig. 3 as shown on the attached page.

In the Specification

In Column 2, Line 44, delete "Nomal" and insert -- Normal --, therefor.

In Column 6, Line 28, delete "streamer 60" and insert -- streamer 52 --, therefor.

In Column 7, Line 11, delete "streamer 60" and insert -- streamer 52 --, therefor.

In the Claims

In Column 14, Line 14, in Claim 9, delete "$d_1(x,y,z) = g_{min}(z) \cdot r(x,y,z)$" and insert -- $d_1(x, y,z) = g_{min}(z) \cdot *r(x,y,z)$ --, therefor.

In Column 15, Line 38, in Claim 24, delete "$d_1(x,y,z) = g_{min}(z) \cdot r(x,y,z)$" and insert -- $d_1(x,y,z) = g_{min}(z) \cdot *r(x,y,z)$ --, therefor.

Signed and Sealed this
Thirty-first Day of December, 2013

Margaret A. Focarino
*Commissioner for Patents of the United States Patent and Trademark Office*